Inventor:
Karl W. Hallden
by: Stewart & Spruyk
Attorneys.

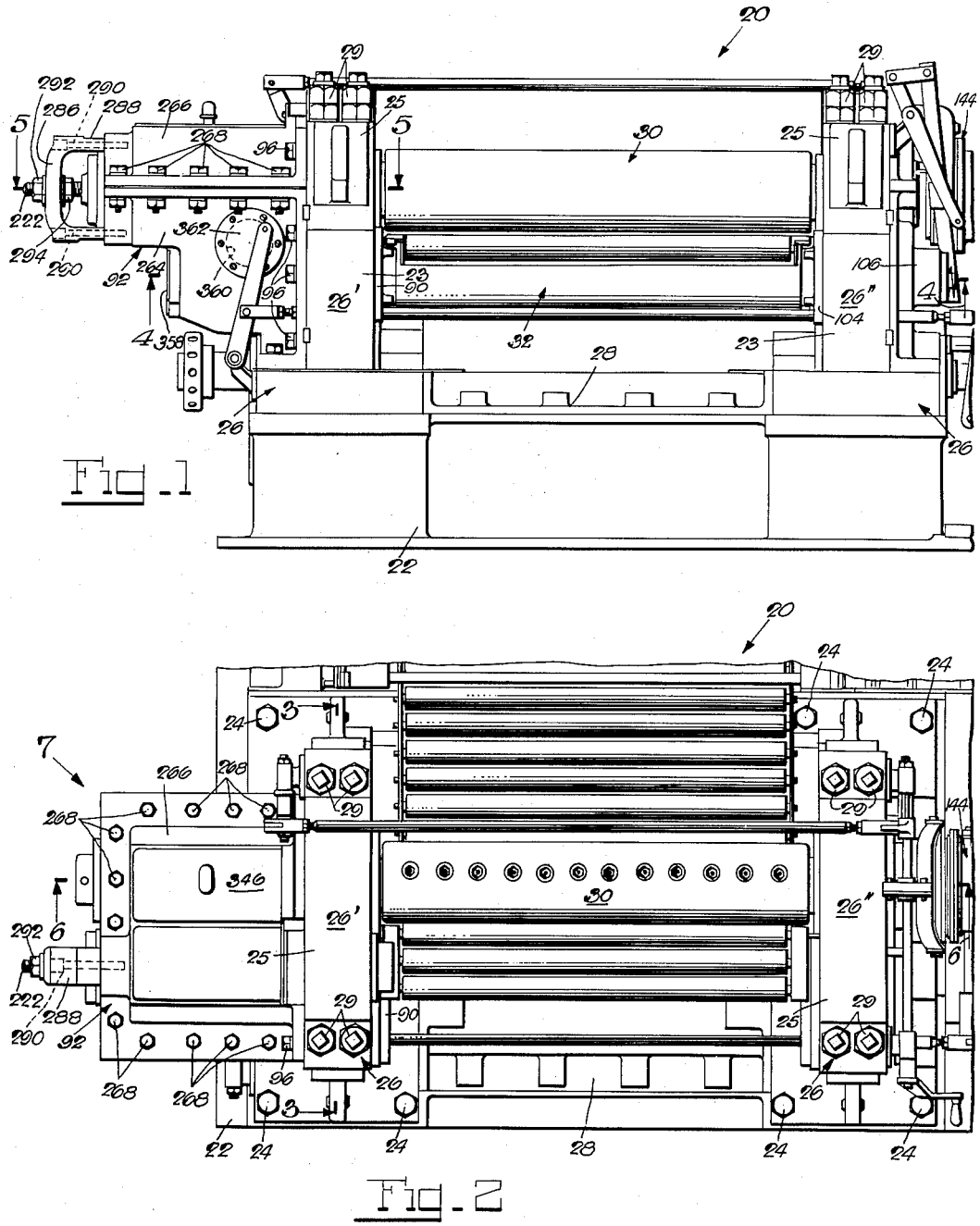

June 12, 1956  K. W. HALLDEN  2,749,984
SHEAR BLADE ALIGNMENT AND MISALIGNMENT MECHANISM
FOR CUTTING SHEARS OF THE ROTARY TYPE
Filed Dec. 11, 1953  6 Sheets-Sheet 5

Inventor:
Karl W. Hallden
by: Steward & Sprugel
Attorneys.

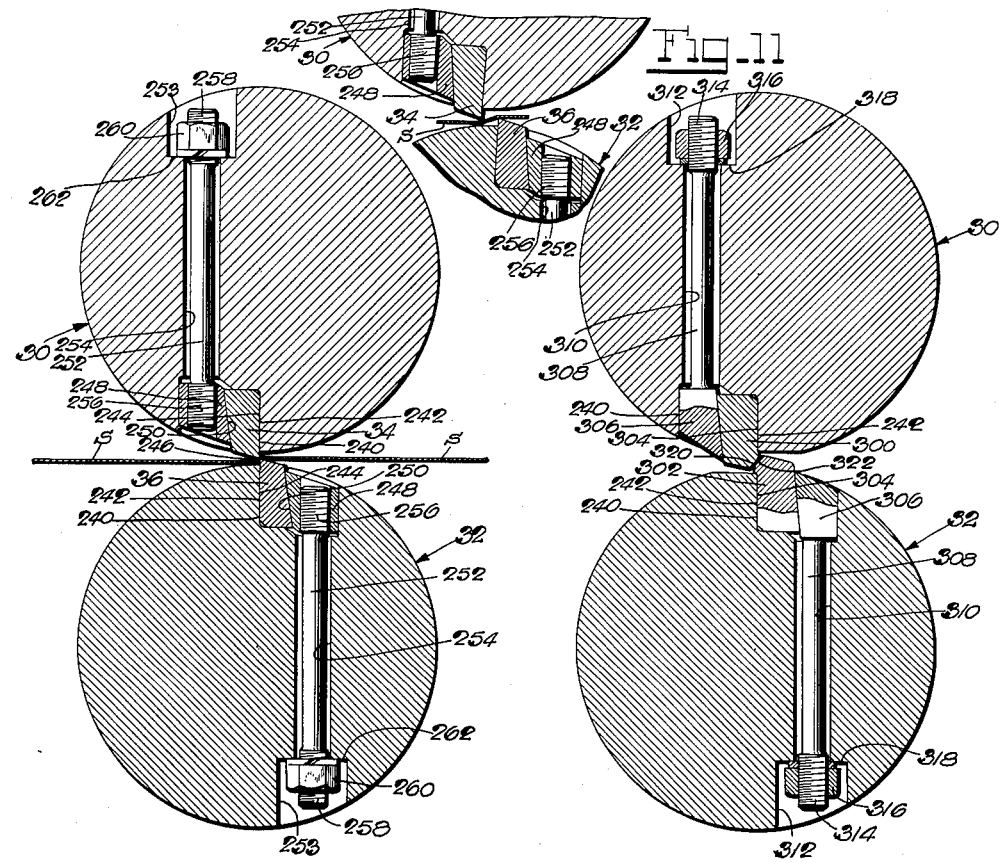
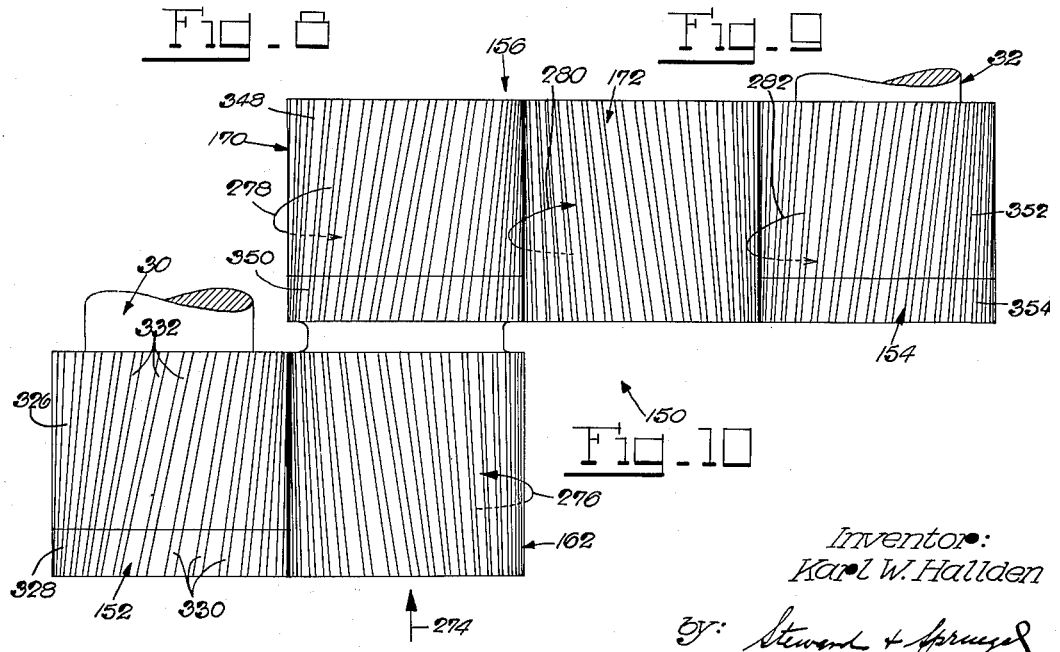

United States Patent Office 2,749,984
Patented June 12, 1956

2,749,984

SHEAR BLADE ALIGNMENT AND MISALIGNMENT MECHANISM FOR CUTTING SHEARS OF THE ROTARY TYPE

Karl W. Hallden, Thomaston, Conn., assignor to The Hallden Machine Company, Thomaston, Conn., a corporation of Connecticut Application December 11, 1953, Serial No. 397,614

20 Claims. (Cl. 164—66)

This invention relates to stock-cutting shears in general, and to cutting shears of the rotary type in particular.

Cutting shears of this type have rotary cutter shafts which are customarily gear-driven and carry shear blades that cooperate to perform on continuously fed stock, such as sheet metal, for instance. In order to achieve satisfactory cuts by the blades and also keep their cutting edges sharp for a maximum length of time, it is, of course, imperative that the blades be in accurate edge-to-edge alignment for each cutting performance, and they must thus be aligned in the initial assembly of the shear. Moreover, wear of the operating parts and bearings of these shears after an extended period of use will inevitably result in sufficient angular play between the cutter shafts to permit the stock to-be-cut to force the blades out of alignment and cause them to cut the stock only partially, if at all. Frequently, disalignment of the shear blades is caused, if not solely then contributively, by excessive backlash due to wear between the gears that drive the cutter shafts, and even if there are provisions to take up this excessive backlash the shear blades will almost invariably remain out of alignment. It is for the foregoing reasons that the shear blades of rotary shears require realignment from time to time in order to maintain their reliable performance. To that end and also for the purpose of initial accurate alignment of the shear blades, it has been the previous practice to mount, in rotary shears of the continuous-cut type, meshing gears of the helical kind on the cutter shafts and to shift one of these shafts with its gear axially relative to the other cutter shaft and its gear and thereby achieve relative angular adjustment between the shafts and, hence, accurate initial alignment or realignment of their shear blades. The same practice of axially shifting one of the cutter shafts and its gear relative to the other cutter shaft and its gear for blade alignment purposes is also followed in rotary shears of the miss-cut type in which one of the cutter shafts is movable toward and away from the other cutter shaft and the helical gears on these shafts are not in mesh with each other but are drivingly connected through intermediate gears, as in the rotary miss-cut shear disclosed in my prior Patent No. 2,642,938, dated June 23, 1953, wherein these gears are for the sake of simplicity shown as spur gears, however. Shifting one of the cutter shafts and its gear for blade-alignment purposes is in either case not only a laborious and time-consuming task which more often than not is performed while the shear is idle, but it is also a bad practice from an engineering standpoint in that it involves deliberate disturbance of the very bearing surfaces which require fits that are not only accurate for maintaining the imperative alignment of the cutter shafts, but are relatively tight as well in order to withstand the large reactive stresses from the shear blades without being struck out in short order.

It is the primary aim and object of the present invention to have in a rotary shear of either the continuous-cut type or the miss-cut type, equipment wherewith the shear blades may accurately be aligned without requiring axial shifting of either one of the cutter shafts and its driving gear, thereby to eliminate the aforementioned serious disadvantages entailed in the prior practice of aligning these blades.

It is another object of the present invention to construct the aforementioned equipment so that the same will, on manipulation by an operator, cause only harmless relative rotation and no other motion between the cutter shafts for the accurate alignment of their shear blades.

It is a further object of the present invention to construct the aforementioned equipment so that the same may advantageously be manipulated when the shear is running, and the ensuing relative rotation between the cutter shafts for the alignment of the blades is superimposed upon the normal drive of the former.

Another object of the present invention is to construct the aforementioned equipment so that the same may, on even hasty manipulation by an operator, cause only minute relative rotation per time unit between the cutter shafts, thereby not only obviating any damaging clash between the shear blades when they are being aligned while the shear is running, but also enabling the operator to achieve, by sound and feel alone, exceptionally accurate alignment of the blades in the running shear simply by first adjusting the cutter shafts until the sound of harmless contact between the blades is heard and then correcting the adjustment until this sound dies off.

It is another object of the present invention to further construct the aforementioned equipment so that the same may, alternatively, be manipulated to achieve relative rotation of much larger magnitude per time unit between the cutter shafts, thereby to permit, either in the running condition or in the idle condition of the shear, quick approximate alignment of the blades from such wide disalignment as may occur in the initial assembly of the shear, for instance, and subsequently permit accurate alignment of these blades, when the shear is running, by the aforementioned minute adjustment of the cutter shafts.

A further object of the present invention is to provide the cutter shafts in a rotary shear of either of the aforementioned cut types with combined safety and precision stops which are so coordinated that they come into light contact with one another when the blades are accurately aligned in their cutting position, thereby to facilitate the task of initially aligning or realigning the blades without any danger of causing damaging clash between the same, and also to prevent such clash when the cutter shafts have angular play as a result of wear of the operating parts or bearings of the shear.

Another object of the present invention is to make the contacting faces of the aforementioned stops of involute contour so that they roll on each other in typical mating gear-tooth fashion when the blades move into and out of cutting relation with each other, thereby to prevent any relative angular creep between the cutter shafts and, hence, also between the blades at least within the range in which the latter penetrate the stock to-be-cut, and in consequence achieve clean cuts with a minimum of force and with the least dulling effect on the cutting edges of the blades.

It is a further object of the present invention to achieve the aforementioned blade alignment on mere relative rotation and no other motion between the cutter shafts in a rotary shear of either one of the aforementioned cut types, by mounting helical gears on the cutter shafts and drivingly connecting them through a train of intermediate helical gears of which two successive ones are axially shiftable and rotatable as a unit and have teeth of opposite pitch angles in mesh with the adjacent gears, so that relative angular adjustment of the cutter shafts for blade alignment purposes will take place when this gear unit is axially shifted.

It is another object of the present invention to provide for the journal support of the aforementioned gear unit a bearing aggregate which is axially slidable with the latter in the shear frame and is provided with a threaded shank extending through an anchor member on the shear frame and carrying nuts on opposite sides thereof for variably spacing the bearing aggregate from the anchor member, thereby to achieve for blade alignment purposes relative angular adjustment of the cutter shafts of the aforementioned minute or much larger magnitude by manipulating either or both nuts to cause one of them to propel the bearing aggregate or permit much quicker axial shifting of the latter by means other than the nuts.

Further objects and advantages will appear to those skilled in the art from the following, considered in conjunction with the accompanying drawings.

In the accompanying drawings, in which certain modes of carrying out the present invention are shown for illustrative purposes:

Fig. 1 is a front elevation of a rotary shear embodying the present invention;

Fig. 2 is a top plan view of the same shear;

Figure 4:
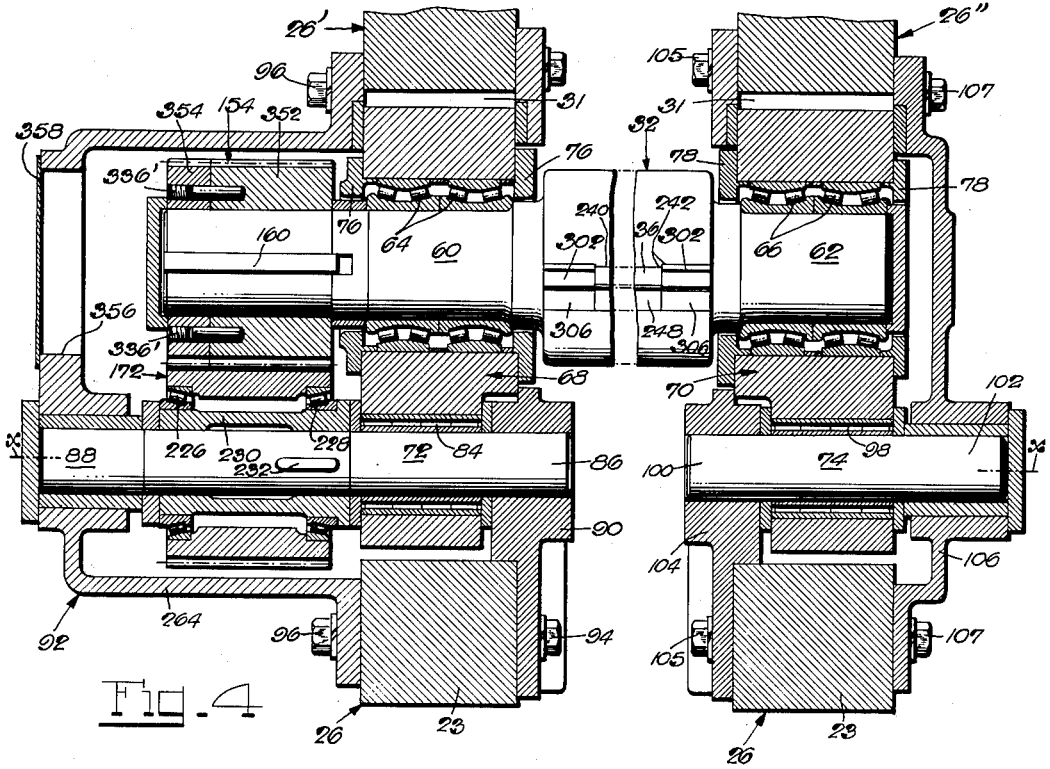
Figure 5:
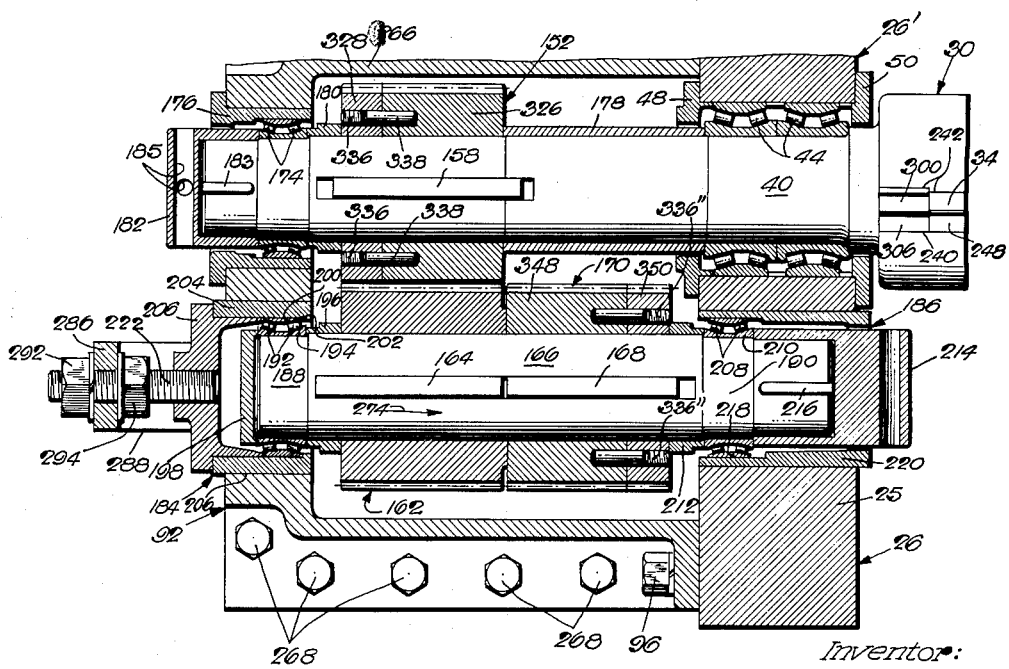
Figure 6:
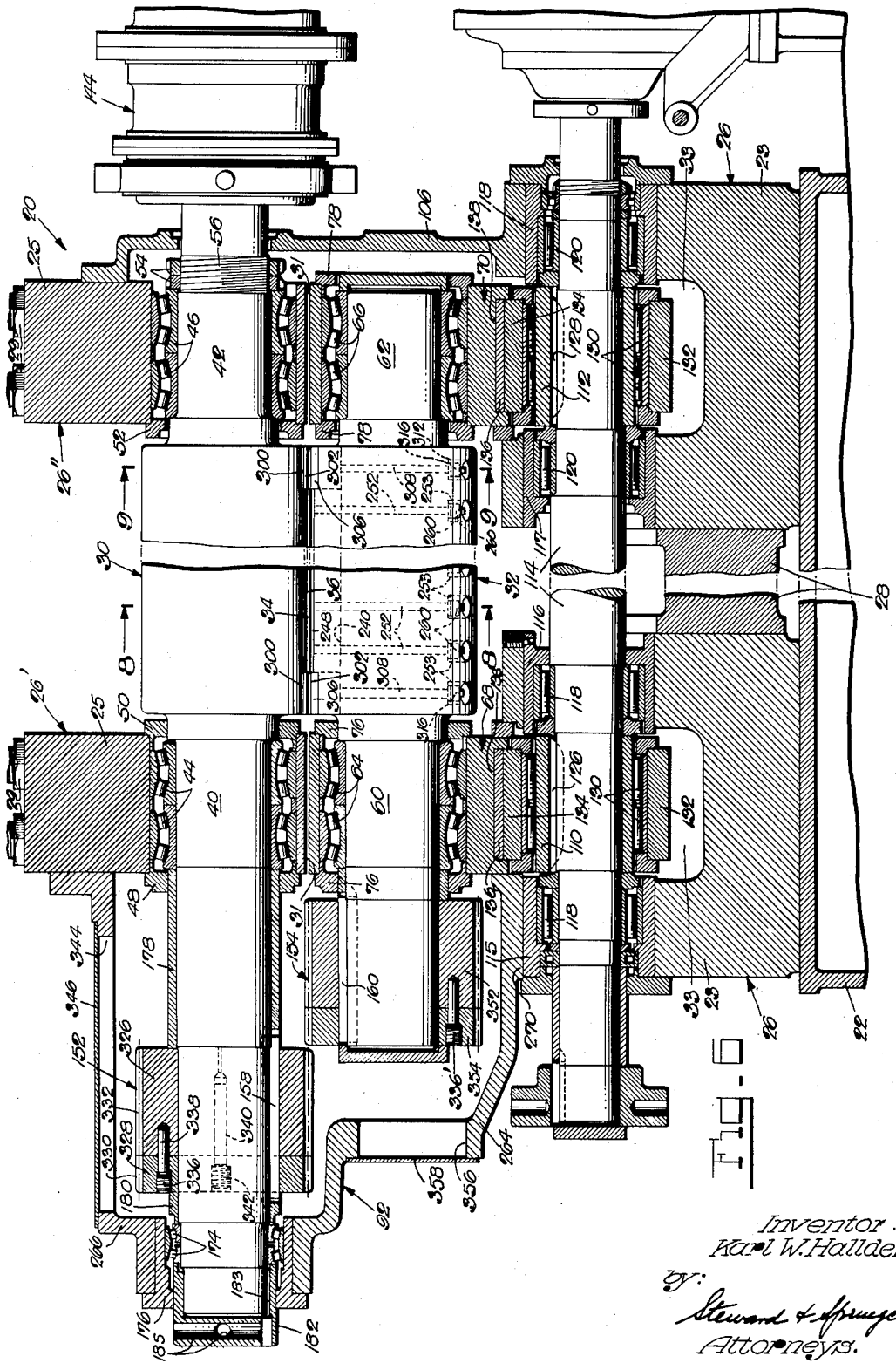
Figure 7:
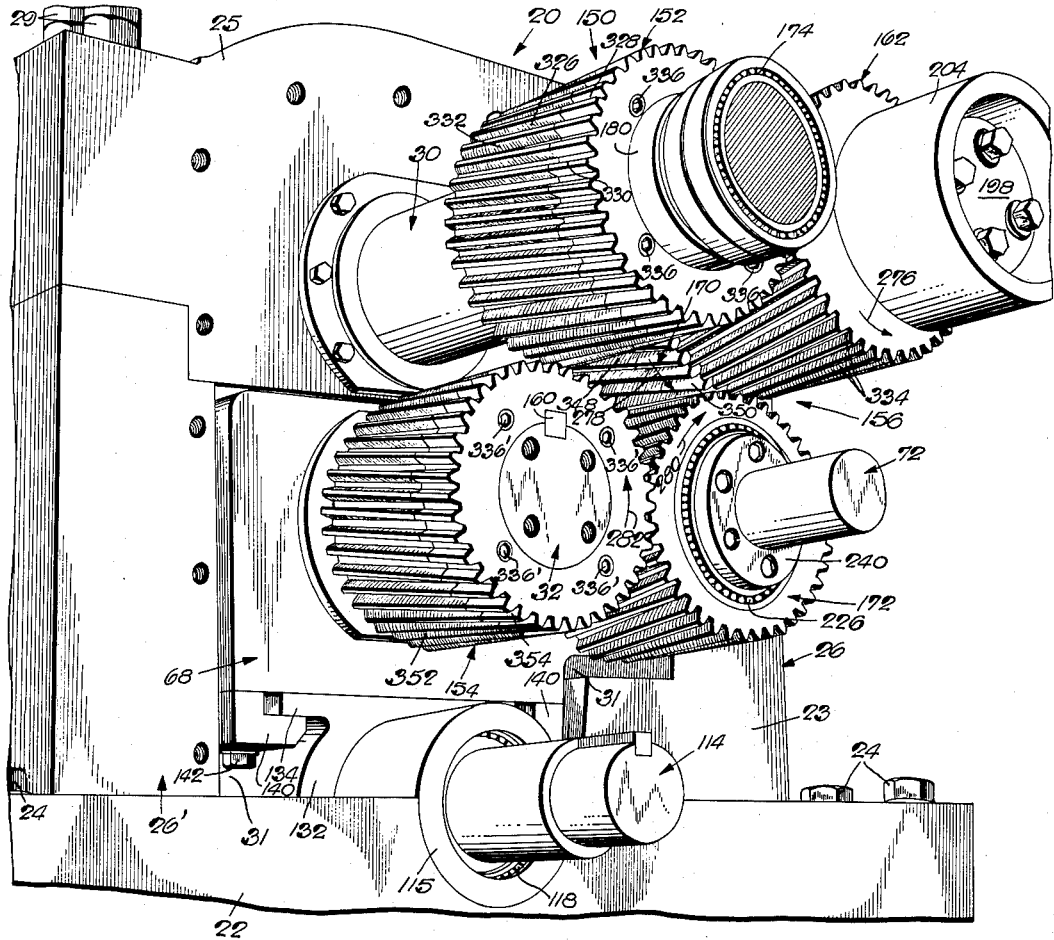
Figure 12:
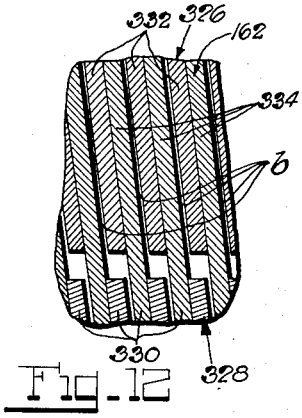
Figure 13:
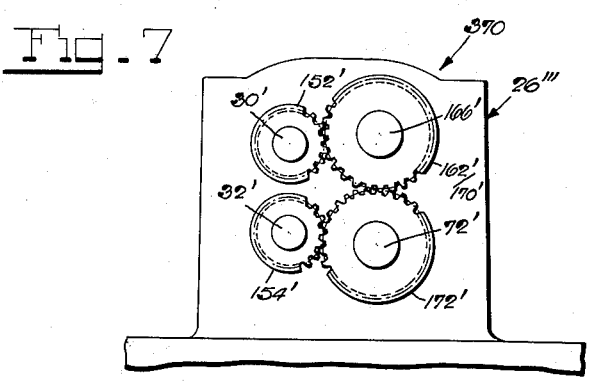

Figs. 4 and 5 are enlarged fragmentary horizontal sections through the shear as taken on the lines 4—4 and 5—5, respectively, of Fig. 1;

Fig. 6 is an enlarged fragmentary vertical section through the shear as taken on the line 6—6 of Fig. 2;

Fig. 7 is a fragmentary perspective view of a part of the shear as seen in the direction of the arrow 7 in Fig. 2;

Figs. 8 and 9 are enlarged cross-sections through the cutter shafts of the shear, as taken on the lines 8—8 and 9—9, respectively, of Fig. 6;

Fig. 10 is a diagrammatic illustration of a certain gear drive of the shear;

Fig. 11 is a fragmentary section similar to that of Fig. 8, but showing the cutter shafts in a slightly different relative angular position;

Fig. 12 is a fragmentary section through mating teeth of two of the gears of the drive of Fig. 10; and Fig. 13 is a fragmentary side view of a rotary shear of a different cut-type embodying the present invention.

Figure 3:
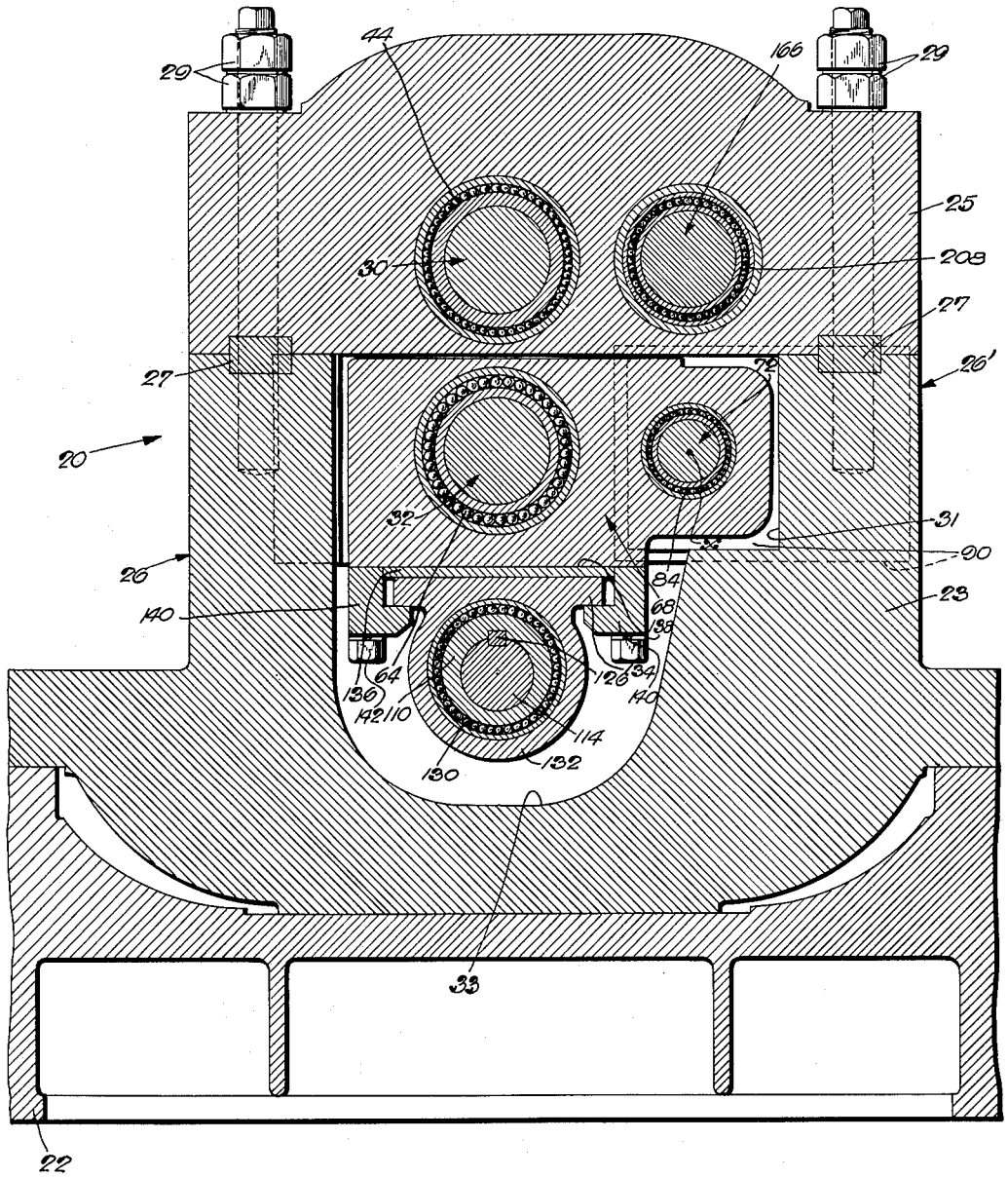
Fig. 3 is an enlarged fragmentary cross-section through the shear as taken on the line 3—3 of Fig. 2.

Referring to the drawings, and more particularly to Figs. 1 to 3 thereof, the reference numeral 20 designates a rotary shear which comprises a base or bed 22 to which spaced upright side frames 26 are bolted as at 24 (Fig. 2). Conveniently, each side frame 26 is made in two sections 23 and 25 (Figs. 3 and 7) which are keyed and bolted to each other as at 27 and 29, respectively, and provide an aperture 31. The lower or base section 23 of each side frame 26 is furthermore provided with a recess 33 which is open to the aperture 31. Interposed between the side frames 26 and suitably mounted on the base 22 is a spacer bracket 28 (Figs. 1, 2 and 6).

Among the operating parts of the instant shear are two parallel rotary cutter shafts 30 and 32 carrying cooperating shear blades 34 and 36, respectively (Figs. 1, 2, 6 and 8). The cutter shaft 30 is arranged substantially vertically above the other cutter shaft 32 so that stock s to be cut by the cooperating shear blades 34 and 36 may be fed substantially horizontally between these cutter shafts (Fig. 8). The shafts 30 and 32 are hereinafter conveniently referred to as "upper" and "lower" cutter shafts, respectively.

The exemplary shear shown in Figs. 1 to 6, inclusive, is of the well-known miss-cut type shown, for instance, in my aforementioned prior Patent No. 2,642,938. To this end, one of the cutter shafts, in this instance the lower cutter shaft 32, is bodily movable toward and away from the other fixed cutter shaft, all as described hereinafter in full detail.

The upper cutter shaft 30, which in this instance is the fixed one, extends between the spaced side frames 26 (Figs. 1 and 2) and has opposite journals 40 and 42 (Fig. 6) which are received in combined journal-and-thrust bearings 44 and 46 in the end frames 26' and 26", respectively. The bearing 44 is held against endwise movement in the side frame 26' by retainer plates 48 and 50 thereon, while the opposite bearing 46 is held against endwise movement in the side frame 26" by a retainer plate 52 thereon and by nuts 54 on a threaded portion 56 of the cutter shaft 30 (Fig. 6).

The lower cutter shaft 32 is received with its opposite journals 60 and 62 in combined journal-and-thrust bearings 64 and 66 in rockers 68 and 70, respectively, which are journalled on stub shafts 72 and 74 in the side frames 26' and 26", respectively, and are received in the apertures 31 in the latter with sufficient clearance to swing therein as required (Figs. 3, 4 and 6). The bearings 64 and 66 for the lower cutter shaft 32 are held against endwise movement in the respective rockers 68 and 70 by retainer plates 76 and 78 thereon, respectively (Figs. 4 and 6). The rocker 68 is, through intermediation of a roller bearing 84, journalled on the stub shaft 72 (Figs. 3 and 4) which is mounted with its opposite ends 86 and 88 in a bracket 90 and a gear case 92 that may conveniently be bolted at 94 and 96 to the opposite sides, respectively, of the frame 26' (Fig. 4). Similarly, the rocker 70 is, through intermediation of a roller bearing 98, journalled on the stub shaft 74 the opposite ends 100 and 102 of which are mounted in brackets 104 and 106 that may conveniently be bolted at 105 and 107 to the opposite sides, respectively, of the other frame 26" (Fig. 4). As further shown in Fig. 4, the stub shafts 72 and 74 are arranged coaxially of each other and their common axis x—x constitutes the rocking axis of the lower cutter shaft 32 (see also Fig. 3).

For causing controlled rocking motion of the lower cutter shaft 32 into and from shearing relation with the upper cutter shaft 30 for cut and miss-cut actions of their shear blades 34 and 36 in a manner to be described, the rockers 68 and 70 are operatively connected with eccentrics 110 and 112, respectively, on a "cam" shaft 114 (Figs. 3 and 6) which is journalled in the side frames 26' and 26".

More particularly, the cam shaft 114 is journalled in replaceable sleeves or cartridges 115, 116 and 117, 118 in the side frames 26' and 26" by sets of antifriction bearings 118 and 120, respectively (Fig. 6) and is suitably held against endwise movement in these side frames. The eccentrics 110 and 112, which are identical in size, are keyed to the cam shaft 114 at 126 and 128, respectively. Since the operating connections between the eccentrics 110 and 112 and their respective rockers 68 and 70 are identical, the following description of one of these operating connections, namely that between the eccentric 110 and the rocker 68, will suffice. Thus, as best shown in Figs. 3 and 6, the eccentric 110 is, through intermediation of an antifriction bearing 130, operatively connected with a follower strap 132 which has a sliding base 134 on a wear plate 136 on the lower surface 138 of the rocker 68. The sliding base 134 of the follower strap 132 is held in engagement with the wear plate 136 by means of opposite gibs 140 which are conveniently bolted at 142 to the rocker 68 (Figs. 3 and 7). Identical parts of the operating connection between the other eccentric 112 and other rocker 70 are designated in Fig. 6 by the same reference numerals.

The cutter shafts 30 and 32 of the instant miss-cut type shear are adapted to be driven in opposite directions in synchronism with each other so that their shear blades 34 and 36 will, during each revolution of the cutter shafts, come into shearing alignment with each other in any event, while they may or may not come into actual shearing relation with each other, depending on the angular position of the eccentrics 110 and 112 at each shearing alignment of the blades 34 and 36. Thus, when the eccentrics 110 and 112 impart their maximum stroke to the respective rockers 68 and 70 (Fig. 3) at the time the shear blades 34 and 36 move into shearing alignment with each other, the latter will cut the stock s as in Fig. 8. However, if during shearing alignment of the shear blades 34 and 36 the eccentrics 110 and 112 move through angular positions in which the lower cutter shaft 32 is out of shearing relation with the upper cutter shaft 30, no cut, i. e. a so-called miss-cut, will result, as will be readily understood.

In the present instance, the upper cutter shaft 30 is the driven shaft, the same being fixed in position (Figs. 3, 6 and 7) and drivingly connected by means of a releasable clutch 144 with a prime mover (not shown) which may be an electric motor. In order to drive the lower cutter shaft 32 from the upper cutter shaft 30 in the required manner, i. e. in a direction opposite to but in synchronism with the upper cutter shaft 30, there is provided in the previously mentioned gear casing 92 a gear drive between these cutter shafts. This gear drive, which is designated by the reference numeral 150 and shown in its entirety in Fig. 7, comprises gears 152 and 154 on the upper and lower cutter shaft 30 and 32, and intermediate gearing 156 which connects the gears 152 and 154. The gears 152 and 154, which are keyed at 158 and 160 to their respective cutter shafts 30 and 32, are out of mesh with each other and even axially spaced from each other for a purpose which will appear obvious hereinafter (Figs. 6 and 7). Directly meshing with the gear 152 on the upper cutter shaft 30 is an intermediate gear 162 (Figs. 5 and 7) which is keyed at 164 to a stub shaft 166 that is mounted for rotation and axial movement, in a manner and for a purpose to be described, in the side frame 26' and the gear casing 92. Further keyed at 168 to the same stub shaft 166 is another intermediate gear 170 which, as shown in Fig. 7, is in permanent mesh with another intermediate gear 172 on the stub shaft 72 on which the rocker 68 is journalled (Fig. 4). Finally, the intermediate gear 172 is in direct mesh with the gear 154 on the lower cutter shaft 32 (Figs. 4 and 7).

The end of the upper cutter shaft 30 which carries the gear 152 is preferably further borne in a combined journal-and-thrust bearing 174 in a replaceable sleeve or cartridge 176 in the gear casing 92, so that the considerable bending stresses to which this shaft end is subjected by the torque transmitted from the gear 162 to the gear 152 will be taken up by the bearings 44 and 174 (Figs. 5 and 6). The gear 152 is furthermore held against endwise movement on the cutter shaft 30 by means of spacer sleeves 178 and 180 which are interposed between gear 152 and the bearings 44 and 174, respectively (Fig. 6). The bearing 174 is, in turn, held against axial movement in the cartridge 176 by a cap member 182 which is keyed at 183 to the adjacent end of the cutter shaft 30 and is provided with transverse holes 185 for the insertion of a bar or other tool with which to turn the cutter shaft 30 in the assembly of the shear.

The intermediate gears 162 and 170, which are arranged coaxially of each other and turn in unison with each other and with the stub shaft 166 (Fig. 5), are also adapted to be moved axially as a unit for a purpose described hereinafter. To this end, the stub shaft 166 is, for its rotary and sliding support in the side frame 26' and gear casing 92, provided with a bearing aggregate which consists of separate bearing sections 184 and 186 for the opposite end journals 188 and 190, respectively, on the stub shaft 166. The bearing section 184 comprises a combined journal-and-thrust bearing 192 the inner race 194 of which receives the end journal 188 of the stub shaft 166 and is held spaced from the adjacent gear 162 by an interposed spacer sleeve 196, while a retainer member 198 on the end journal 188 of the stub shaft 166 holds the inner race 194 of the bearing 192 and the spacer sleeve 196 against endwise movement on the stub shaft 166. The outer race 200 of the bearing 192 is held in engagement with an annular shoulder 202 on a sleeve or cartridge 204 by means of a retainer member 206 which is suitably secured to the latter. The cartridge 204, which is axially slidable in an aperture 206 in the gear casing 92, thus forms part of the bearing section 184 which in its entirety is axially slidable in unison with the stub shaft 166. The opposite bearing section 186 comprises a combined journal-and-thrust bearing 208 (Fig. 5) the inner race 210 of which receives the end journal 190 of the stub shaft 166 and is held spaced from the adjacent gear 170 by an interposed spacer sleeve 212. A retainer cap 214, keyed at 216 to the adjacent end of the stub shaft 166, bears against the inner race 210 of the bearing 208 and holds it and the spacer sleeve 212 against endwise movement on the stub shaft 166. The outer race 218 of the bearing 208 may be press-fitted in a cartridge 220 which is axially slidable in the side frame 26'. Thus, also the bearing section 186 is in its entirety axially slidably in unison with the stub shaft 166. The retainer member 206 of the bearing section 184 is provided with a threaded stud 222 which in a manner hereinafter described may be manipulated to shift or adjust the stub shaft 166 with its gears 162 and 170 and its bearing aggregate axially relative to the other gears of the drive 150.

The last intermediate gear 172 is, through intermediation of spaced combination journal-and-thrust bearings 226 and 228, mounted for free rotation on a sleeve 230 which is keyed at 232 to the stub shaft 72 on which the rocker 68 is rotatably mounted.

Since the cutter shafts 30 and 32 are of the same diameter and the gears of the drive 150 have the same pitch diameters, it follows that the cutter shafts will be driven at the same peripheral speed and at a one-to-one ratio. The arrangement of the gears of the drive 150 is furthermore such that the cutter shafts 30 and 32 are driven in opposite directions. Hence, the shear blades 34 and 36, once they are properly aligned on relative angular adjustment of the cutter shafts 30 and 32, will come into shearing alignment with each other once during each revolution of the cutter shafts, and they will then be in or out of shearing relation with each other depending on the momentary position of the eccentrics 110 and 112, as will be readily understood.

The cam shaft 114, which carries the eccentrics 110 and 112, is preferably driven from the same prime mover which drives the cutter shafts 30 and 32, and interposed between this prime mover and the cam shaft 114 is a change-speed mechanism (not shown) which may be like or similar to that shown in my aforementioned prior Patent No. 2,642,938, and which serves to change the speed ratio between the cutter shafts 30, 32 and the cam shaft 114. Thus, the change-speed mechanism may be preset to achieve, for instance, a one-to-one speed ratio between the cutter shafts and the cam shaft, in which case the eccentrics 110 and 112 will impart their maximum upward stroke to the lower cutter shaft 32 every time the shear blades 34 and 36 move into shearing alignment with each other once during each revolution of the cutter shafts, with the result that stock is cut on each revolution of the cutter shafts while the stock is continuously fed between the latter. The change-speed mechanism may also be preset to achieve any one of a number of different speed ratios, other than one-to-one, between the cutter shafts 30, 32 and the cam shaft 114 in order to achieve different numbers of miss-cuts between successive cuts by the shear blades 34 and 36. For instance, the change-speed mechanism may be preset to achieve a 3 to 1 speed ratio between the cutter shafts 30, 32 and the cam shaft 114, in which case the shear blades 34 and 36 will, between successive cutting actions thereof, come twice into shearing alignment without coming into shearing relation with each other, resulting in two miss-cut actions of the shear blades between successive cutting actions thereof. In thus presetting the change-speed mechanism, the length of cut stock may be varied, all as more fully described in my aforementioned prior Patent No. 2,642,938.

The shear blades 34 and 36 may be identical in size and shape (Fig. 8) and their mounting in the respective cutter shafts 30 and 32 may also be identical, wherefore a description of the mounting of one of these shear blades, namely of the shear blade 36, will suffice. Thus, the cutter shaft 32 is provided in its periphery with a machined longitudinal groove 240 of which the side wall 242 extends in a plane radiating from the axis of the cutter shaft 32. Located in this groove 240 is the shear blade 36 such that its plane face 244 which terminates at the shear edge 246 of the blade bears against the side wall 242 of the groove 240. The shear blade 36 is thus firmly held in place in the cutter shaft 32 by a plurality of wedge strips 248 which are arranged end-to-end in the groove 240 behind the shear blade 36 and engage an inclined face 250 of the latter. Each of the wedge strips 248 is drawn into firm clamping engagement with the shear blade 36 by a plurality of anchor bars 252 which extend through transverse holdes 254 in the cutter shaft 32 and are threaded at one end, as at 256, into the wedge strip. The opposite threaded ends 258 of the anchor bars 252 extend into counter bores 253 in the cutter shaft 32 and receive nuts 260 which are firmly drawn against internal annular shoulders 262 in the cutter shaft (see also Fig. 6). Identical parts of the same mounting of the other shear blade 34 in the cutter shaft 30 are designated by the same reference numerals. The instant mounting of each shear blade in its respective cutter shaft also readily permits removal of the former for occasional sharpening or even replacement of the same.

The gear casing 92 on the side of the frame 26' is, in the present instance, formed in two complemental sections 264 and 266 which are bolted together as at 268 (Figs. 1 and 2). Further the lower casing section 264 forms a cap 270 over the upper half of the bearing cartridge 115 (Fig. 6) of which the lower half is received in the base 22 as shown in Fig. 7 in which the gear casing 92 is omitted for the sake of illustrating the normally hidden gear drive 150 between the cutter shafts 30 and 32. The rotary shear described so far is, with the exception of the axially slidable gear unit 162 and 170, conventional in every respect and does not form any part of the present invention.

Wear of the operating parts and bearings of the present shear will eventually result in sufficient angular play between the cutter shafts 30 and 32 to permit the stock to be cut to force the shear blades 34 and 36 out of alignment and cause them to cut the stock only partially, if at all. It is one of the important aspects of the present invention to provide for ready relative angular adjustment of the cutter shafts 30 and 32 in order to realign the shear blades 34 and 36 whenever necessary and also accurately align them in the initial assembly of the shear. To this end, the gears of the drive 150 are of the helical type and the gear unit 162, 170 is axially slidably arranged as explained hereinbefore. Moreover, the teeth of the sliding gears 162 and 170 have opposite pitch angles. This is all shown in Fig. 7, and also in Fig. 10 in which the several gears of the drive 150 are for the sake of clarity laid out in a common plane. Assuming that the cutter shafts 30 and 32 have excessive angular play and their shear blades 34 and 36 gape apart in a manner like or similar to that shown in Fig. 11 when they meet stock s to be cut, the shear blades may be realigned (Fig. 8) by simply shifting the gear unit 162, 170 axially in the direction of the arrow 274 in Fig. 10. In thus shifting the gear unit 162, 170 in the direction of the arrow 274, and assuming the cutter shaft 30 and its gear 152 to remain non-rotatable for a clearer understanding of the adjustment, it follows from Fig. 7 and even more readily from Fig. 10 that the gear 162 will, by virtue of the cam action between its helical teeth and those of the non-rotatable gear 152, be slightly turned counterclockwise as indicated by the arrows 276 in Figs. 7 and 10. The gear 170, which rotates in unison with the gear 162, will also rotate counterclockwise as indicated by the arrows 278 in Figs. 7 and 10. The remaining gears 172 and 154 will be turned in the directions of the arrows 280 and 282, respectively, in the same figures, and it follows that the gear 154 and its cutter shaft 32 will be turned counterclockwise (Figs. 7, 10 and 11), with the result that the shear blade 36 on the cutter shaft 32 will be advanced into correct cutting alignment with the shear blade 34 on the other cutter shaft. Conversely, the shear blades 34 and 36 will be disaligned on axially shifting the gear unit 162, 170 in the opposite direction, as will be readily understood.

The gear unit 162, 170 with its stub shaft 166 and bearing aggregate 184, 186 (Fig. 5) may, for blade alignment or disalignment purposes, readily be shifted axially relative to the other gears of the drive 150 by means of the previously described stud 222. To this end, the stud 222 extends through the yoke 286 of a U-shaped bracket 288 (Figs. 1, 2 and 5) which is conveniently bolted at 290 to the gear casing 92, and the stud 222 receives on opposite sides of the yoke 286 nuts 292 and 294. Thus, for axially shifting the gear unit in the direction of the arrow 274 in Figs. 5 and 10 to achieve blade alignment, as described hereinbefore, it is merely necessary to loosen the nut 292 and turn it away from the yoke 286, and then turn the opposite nut 294 against the yoke and thereby shift the gear unit 162, 170 in micrometer-screw fashion slowly in the direction of the arrow 274 until the shear blades are in shearing alignment with each other. Once the shear blades are properly aligned, the cutter shafts 30 and 32 may readily be locked in their adjusted relative angular position by simply turning the nut 292 back against the yoke 286 and tightening the former. For initial rough alignment of the shear blades 34 and 36 from wide disalignment in the assembly of the shear, the stud 222 and, hence, the gear unit 162, 170 may be shifted manually much quicker than by driving either nut 292 or 294 whichever would bring about alignment of the shear blades or of their reception grooves in the cutter shafts if they are not yet mounted therein. After rough-alignment of the shear blades in this fashion, recourse may advantageously be had to the mentioned micrometer-screw-like adjustment of the gear unit 162, 170 for accurate alignment of the shear blades.

When the described relative angular adjustment of the cutter shafts 30 and 32 is undertaken when the shear is idle, it is most likely that the lower cutter shaft 32 is turned while the upper cutter shaft 30 remains stationary. This is due to the fact that the resistance to rotation encountered by the lower cutter shaft 32 is almost invariably much less than that encountered by the upper cutter shaft 30 from the prime mover of the shear and its driving connection with this upper cutter shaft.

It appears from Fig. 5 that relative angular adjustment of the cutter shafts 30 and 32 for blade realignment purposes may well be undertaken while the shear is running. In doing so, the task of realigning the shear blades is even more facilitated and the blade alignment achieved is most accurate. Thus, an operator performing this task need merely rely on sound and feel and hardly on accurate eyesight, simply by first adjusting the cutter shafts until the sound of harmless contact between the shear blades unmistakably indicates to him an immediate end to the then tight adjustment, and then loosening the adjustment until this sound dies off. Of course, when relative angular adjustment of the cutter shafts 30 and 32 for blade realignment purposes is undertaken while the shear is running, the ensuing slight relative rotation between the cutter shafts is superimposed upon their normal drive.

In order to prevent damaging clash between the shear blades 34 and 36 when the cutter shafts 30 and 32 have excessive angular play and before the shear blades are realigned, the cutter shafts 30 and 32 are provided, preferably at the opposite ends of their shear blades, with combined safety and precision stops 300 and 302, respectively (Figs. 6 and 9). These stops 300 and 302 are so coordinated that they move into abutting engagement with each other when the shear blades 34 and 36 are in their shearing relation (Fig. 8) also in accurate shearing alignment with each other and, hence, prevent any clash between the shear blades under any and all circumstances. Therein lies the safety aspect of these stops. The stops 300 and 302 are further advantageous for the inital alignment or every succeeding realignment of the shear blades, for the operator performing the task need merely gauge the relative angular adjustment of the cutter shafts, by sound and feel and/or eyesight, from these stops and not from the shear blades at all, thereby preventing under any circumstances damaging clash between the shear blades if the operator should, for instance, be too hasty in his adjustment of the cutter shafts.

The stops 300 and 302 at both ends of the cutter shafts 30 and 32 are identical and so are their mountings in the respective cutter shafts, wherefore only one of these stops, namely the stop 302 in Fig. 9, and its mounting in the cutter shaft 32 will be described in detail. Thus, the stop 302 is located in the end of the same peripheral groove 240 in which the shear blade 36 is located (Figs. 8 and 9), and the face 304 of the stop moreover engages the radial side wall 242 of the groove 240. The stop 302 is firmly held in the correct position in the groove 240 by a wedge-shaped end 306 on an anchor bar 308 which extends through a transverse hole 310 in the cutter shaft 32 and into a counterbore 312 in the latter. The end 314 of the anchor bar 308 which extends into the counterbore 312 is threaded and receives a nut 316 which is firmly drawn against an annular shoulder 318 in the cutter shaft 32 in order to hold the wedge end 306 of the anchor bar 308 in firm holding engagement with the correctly located stop 302 in the groove 240. Of course, the stop 302 may readily be replaced if the same should eventually be worn to such an extent as to permit clash between the shear blades. Identical parts of the mounting of the other stop 300 in Fig. 9 are designated by the same reference numerals.

Fig. 9 shows that the contacting surfaces 320 and 322 of the stops 300 and 302 are, in the present instance, involute curves which roll on each other in typical mating gear-tooth fashion when the shear blades move into and out of cutting relation with each other, thereby preventing any relative angular creep between the cutter shafts and, hence, also between the shear blades at least within the range in which the latter penetrate the stock to be cut, and in consequence achieving clean cuts with a minimum of force and with the least dulling effect on the cutting edges of the blades. The involute shape of the contact surfaces 320 and 322 of the stops 300 and 302 also facilitates the task of realigning the shear blades when the shear is idle, in that the stops permit accurate alignment of these blades in any angular relative position of the latter in which these involute stop surfaces mate in typical gear-tooth fashion, so that the faces 244 of the shear blades 34 and 36 need not necessarily be in exact planar alignment for their accurate realignment.

Frequently, disalignment of the shear blades is caused, if not solely then contributively, by excessive backlash between the gears of the drive between the cutter shafts, and unless this backlash is first taken up the shear blades cannot be realigned in the aforementioned manner. If there is any backlash at all, the same usually occurs between all the meshing gears of the drive, wherefore it is necessary to take up the backlash between all of these gears. In the present instance, take-up of the backlash is accomplished by the use of split gears in the drive 150 between the cutter shafts 30 and 32. Since at least one of each pair of meshing gears must be a split gear in order to take up backlash between them, and in order to keep the number of split gears at a minimum, the end gears 152 and 154 on the cutter shafts 30 and 32 and the intermediate gear 170 are of the split type (Figs. 7 and 10). Thus, split gear 152 is adapted to take up backlash between it and the gear 162, and split gear 170 is adapted to take up backlash between it and the gear 172, while split gear 154 is adapted to take up backlash between it and the gear 172. The split gear 152 is formed by two complemental sections 326 and 328 both of which are keyed at 158 to the cutter shaft 30 (Fig. 6). Hence, on spreading these gear sections 326 and 328 apart in a manner to be described, the helical teeth 330 of the gear section 328 will be separated from the helical teeth 332 of the gear section 326 (Fig. 12) and in consequence disalign from the teeth 332 sufficiently to take up the backlash $b$ between the teeth 330, 332 of gear 152 and the helical teeth 334 of gear 162. The sections 326 and 328 of the gear 152 may be spread apart for backlash take-up by driving angularly spaced threaded plugs 336 in the gear section 328 deeper into the latter (Figs. 6 and 7) and against aligned pins 338 which are seated in the gear section 326 (Fig 6), thereby causing the gear section 328 to back away from the gear section 326 to an extent necessary to take up the backlash between the gears 152 and 162 (Fig. 12). Backing-up of the gear section 328 in the manner just explained will be accompanied by an axial shift of like magnitude of the bearing 174 and cap member 182 in the sleeve 176. In order that the key 158 may not be subjected to appreciable shear forces from the adjusted sections 326 and 328 of the gear 152, these gear sections are preferably provided with one or more shear pins 340 which in this instance are threadedly connected at 342 with the gear section 328 for axial movement therewith (Fig. 6). Ready access to the plugs 336 with an Allen-type wrench for taking up backlash between the gears 152 and 162 may be had through an opening 344 in the gear casing 92 which is normally closed by a removable cover plate 346.

The other split gears 170 and 154 have similar provisions for spreading their respective gear sections 348, 350 and 352, 354 (Figs. 5, 6 and 7). The threaded plugs 336' in the section 354 of the split gear 154 are, for the take-up of backlash between the gears 154 and 172, accessible through an opening 356 in the gear casing 92 which is normally closed by a removable cover plate 358 (Fig. 6). The threaded plugs 336" in the section 350 of the last split gear 170 (Fig. 5) are, for the take-up of backlash between the gears 170 and 172, accessible through an opening 360 in the gear casing 92 which is normally closed by a removable cover plate 362 (Fig. 1).

Having once taken up all the backlash between the gears of the drive 150 between the cutter shafts 30 and 32, in the aforementioned manner, the shear blades 34 and 36 will almost invariably be out of shearing alignment and, hence, require realignment. Accurate realignment of the shear blades may then be achieved quickly and easily in the described manner.

While the present invention described so far is embodied in a rotary shear of the miss-cut type, it is fully obvious that the same may with equal advantage be embodied in a rotary shear 370 of the continuous-cut type (Fig. 13) in which both cutter shafts 30' and 32' are journalled in the frame structure 26''' but are bodily immovable relative to each other. The cutter shafts 30' and 32' carry helical gears 152' and 154' which are drivingly connected through intermediate helical gears 162', 170' and 172', of which the gears 162' and 170' are mounted on a rotary stub shaft 166' in the frame structure 26''', while the other intermediate gear 172' is journalled on a stub shaft 72' in the frame structure 26'''. These gears may be arranged like the previously described gears 152, 154, 162, 170 and 172, and the gears 162' and 170' may be axially shifted or adjusted in unison to achieve relative angular adjustment of the cutter shafts 30' and 32' for accurate alignment of their shear blades. Also, the gears 152', 154' and 170' may be of the split type to permit take-up of the backlash between all the gears.

The axially shiftable gear unit 162', 170' of the continuous-cut type shear 370 in Fig. 13, while primarily intended for initial alignment and realignment of the shear blades as described, may also form the basic structure for converting the shear 370 from the continuous-cut type into the miss-cut type. Thus, it is fully within the scope of this invention to shift this gear unit to achieve between successive cuts by the shear blades any desired number of miss-cut actions thereof, simply by causing for miss-cut performance of the shear blades deliberate disalignment of the latter of sufficient extent to prevent scratching of the stock by the blades, and causing realignment of the blades for each cut performance of the same.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. In a rotary shear having two parallel rotary cutter shafts provided with longitudinal shear blades, the combination of a first helical gear on each cutter shaft; a train of intermediate helical gears drivingly connecting said first gears for turning said cutter shafts in opposite directions at relative speeds to bring said blades into periodic shearing relation with each other when said gears are driven, two successive ones of said intermediate gears being axially movable and rotatable as a unit and having teeth of opposite pitch angles, respectively, to cause relative angular adjustment of said cutter shafts for blade alignment and disalignment on axially shifting said gear unit in opposite directions, respectively; and means for axially shifting said gear unit.

2. The combination in a rotary shear as set forth in claim 1, in which said shifting means is operable while said gears are driven.

3. In a rotary shear having two parallel rotary cutter shafts provided with longitudinal shear blades, the combination of a first helical gear on each cutter shaft; a train of intermediate helical gears drivingly connecting said first gears for turning said cutter shafts in opposite directions at relative speeds to bring said blades into periodic shearing relation with each other when said gears are driven; a journal and thrust bearing aggregate for two successive coaxial gears of said train, said succesisve gears having teeth of opposite pitch angles, respectively, and being rotatable as a unit, and said bearing aggregate being axially shiftable to move said gear unit in opposite directions relative to the other gears and achieve relative angular adjustment of said cutter shafts for blade alignment and disalignment, respectively; and means for axially shifting said bearing aggregate.

4. In a rotary shear having two parallel rotary cutter shafts provided with longitudinal shear blades, the combination of a first helical gear on each cutter shaft; a train of intermediate helical gears drivingly connecting said first gears for turning said cutter shafts in opposite directions at relative speeds to bring said blades into periodic shearing relation with each other when said gears are driven, two successive ones of said intermediate gears being axially movable and rotatable as a unit and having teeth of opposite pitch angles, respectively; and means for axially adjusting said gear unit to cause relative angular adjustment of said cutter shafts for blade alignment.

5. The combination in a rotary shear as set forth in claim 4, in which said intermediate gears are three in number.

6. In a rotary shear of the miss-cut type having two parallel rotary cutter shafts of which one is rockable toward and away from the other about a parallel axis and both are provided with longitudinal shear blades, the combination of a first helical gear on each cutter shaft; a train of intermediate helical gears drivingly connecting said first gears for turning said cutter shafts in opposite directions at relative speeds to bring said blades into periodic shearing alignment with each other when said gears are driven, at least one of said intermediate gears being mounted for rotation about said rocking axis and the gear connection between said one gear and said one cutter shaft being rockable with the latter, and two successive ones of said intermediate gears being axially movable and rotatable as a unit and having teeth of opposite pitch angles, respectively; and means for axially adjusting said gear unit to cause relative angular adjustment of said cutter shafts for blade alignment.

7. The combination in a rotary shear of the miss-cut type set forth in claim 6, in which said gear unit forms no part of said gear connection.

8. In a rotary shear of the miss-cut type having two parallel rotary cutter shafts of which one is rockable toward and away from the other about a parallel axis and both are provided with longitudinal shear blades, the combination of a first helical gear on each cutter shaft; a train of intermediate helical gears drivingly connecting said first gears for turning said cutter shafts in opposite directions at relative speeds to bring said blades into periodic shearing alignment with each other when said gears are driven, at least one of said intermediate gears being mounted for rotation about said rocking axis and the gear connection between said one gear and said one cutter shaft being rockable with the latter; a journal and thrust bearing aggregate for two successive coaxial gears of said train, said successive gears forming no part of said gear connection and being rotatable as a unit and their teeth having opposite pitch angles, respectively, and said bearing aggregate being axially shiftable to move said gear unit relative to the other gears and achieve relative angular adjustment of said cutter shafts for blade alignment; and means for axially shifting said bearing aggregate.

9. In a rotary shear having two parallel rotary cutter shafts provided with longitudinal shear blades, the combination of a first helical gear on each cutter shaft; a train of intermediate helical gears drivingly connecting said first gears for turning said cutter shafts in opposite directions at relative speeds to bring said blades into periodic shearing relation with each other when said gears are driven, two successive ones of said intermediate gears being axially movable and rotatable as a unit and having teeth of opposite pitch angles, respectively, to cause relative angular adjustment of said cutter shafts for blade alignment and disalignment on axially shifting said gear unit in opposite directions, respectively; means for axially shifting said gear unit; and stops on said cutter shafts, respectively, so coordinated as to abut each other when said blades are in their shearing relation aligned with each other.

10. The combination in a rotary shear as set forth in claim 9, in which the abutting surfaces of said stops are involute curves that mate in gear-tooth fashion when said blades move through a range in which they are in shearing relation with each other.

11. In a rotary shear having two parallel rotary cutter shafts provided with longitudinal shear blades, the combination of a first helical gear on each cutter shaft; a train of intermediate helical gears drivingly connecting said first gears for turning said cutter shafts in opposite directions at relative speeds to bring said blades into periodic shearing relation with each other when said gears are driven, two successive ones of said intermediate gears being axially movable and rotatable as a unit and having teeth of opposite pitch angles, respectively; means for axially adjusting said gear unit to cause relative angular adjustment of said cutter shafts for blade alignment; and stops on said cutter shafts, respectively, so coordinated as to abut each other when said blades are in their shearing relation aligned with each other.

12. The combination in a rotary shear as set forth in claim 11, in which the abutting surfaces of said stops are involute curves that mate in gear-tooth fashion within a range of relative positions of said blades in which they are in shearing relation with each other.

13. In a rotary shear of the miss-cut type having two parallel rotary cutter shafts of which one is rockable toward and away from the other about a parallel axis and both are provided with longitudinal shear blades, the combination of a first helical gear on each cutter shaft; a train of intermediate helical gears drivingly connecting said first gears for turning said cutter shafts in opposite directions at relative speeds to bring said blades into periodic shearing alignment with each other when said gears are driven, at least one of said intermediate gears being mounted for rotation about said rocking axis and the gear connection between said one gear and said one cutter shaft being rockable with the latter, and two successive ones of said intermediate gears being axially movable and rotatable as a unit and having teeth of opposite pitch angles, respectively; means for axially adjusting said gear unit to cause relative angular adjustment of said cutter shafts for blade alignment; and stops on said cutter shafts, respectively, so coordinated as to abut each other when said blades are in their shearing relation aligned with each other.

14. In a rotary shear having a frame with an apertured wall and two parallel rotary cutter shafts journalled in the frame and provided with longitudinal shear blades, the combination of a first helical gear on each cutter shaft; a train of intermediate helical gears journalled in said frame and drivingly connecting said first gears for turning said cutter shafts in opposite directions at relative speeds to bring said blades into periodic shearing relation with each other when said gears are driven; a journal and thrust bearing aggregate for two successive coaxial gears of said train, said successive gears having teeth of opposite pitch angles, respectively, and being rotatable as a unit, and said bearing aggregate being axially shiftable to move said gear unit in opposite directions relative to the other gears and achieve relative angular adjustment of said cutter shafts for blade alignment and disalignment, respectively; a threaded shank extending longitudinally from said bearing aggregate and through the aperture in said frame wall; and nuts received by said shank on opposite sides of said frame wall and being manipulatable for axially adjusting said bearing aggregate as well as for locking the latter in adjusted position.

15. In a rotary shear of the miss-cut type having a frame with a first shaft and an apertured wall, a rocker turnable about said first shaft, and two rotary cutter shafts carried by said frame and rocker, respectively, in parallel relation to each other and to said first shaft and being provided with longitudinal shear blades, the combination of a first helical gear on each cutter shaft; a train of three intermediate helical gears journalled in said frame and drivingly connecting said first gears for turning said cutter shafts in opposite directions at relative speeds to bring said blades into periodic shearing alignment with each other when said gears are driven, one of said intermediate gears being rotatable on said first shaft and the other two intermediate gears being coaxial and turnable as a unit and having teeth of opposite pitch angles, respectively; a journal and thrust bearing aggregate for said gear unit axially shiftable in said frame to move said gear unit in opposite directions relative to the other gears and achieve relative angular adjustment of said cutter shafts for blade alignment and disalignment, respectively; a threaded shank extending longitudinally from said bearing aggregate and through the aperture in said frame wall; and nuts received by said shank on opposite sides of said frame wall and being manipulatable for axially adjusting said bearing aggregate as well as for locking the latter in adjusted position.

16. In a rotary shear having two parallel rotary cutter shafts provided with longitudinal shear blades, the combination of a first helical gear on each cutter shaft; a train of three intermediate helical gears drivingly connecting said first gears for turning said cutter shafts in opposite directions at relative speeds to bring said blades into periodic shearing relation with each other when said gears are driven, two successive ones of said intermediate gears being axially movable and rotatable as a unit and having teeth of opposite pitch angles, respectively, to cause relative angular adjustment of said cutter shafts for blade alignment and disalignment on axially shifting said gear unit in opposite directions, respectively, each of said first gears and the intermediate gear out of mesh therewith being formed of split sections and having means for axially adjusting one section away from the other section and for locking the former in its adjusted position to take up all backlash between the gears on adjustment of said split-section gears; and means for axially shifting said gear unit.

17. In a rotary shear having two parallel rotary cutter shafts provided with longitudinal shear blades, the combination of a first helical gear on each cutter shaft; a train of three intermediate helical gears drivingly connecting said first gears for turning said cutter shafts in opposite directions at relative speeds to bring said blades into periodic shearing relation with each other when said gears are driven, two successive ones of said intermediate gears being axially movable and rotatable as a unit and having teeth of opposite pitch angles, respectively, to cause relative angular adjustment of said cutter shafts for blade alignment and disalignment on axially shifting said gear unit in opposite directions, respectively; and means for axially adjusting said gear unit to cause relative angular adjustment of said cutter shafts for blade alignment, each of said first gears and the intermediate gear out of mesh therewith being formed of split sections and having means for axially adjusting one section away from the other section and for locking the former in its adjusted position to take up all backlash between the gears on adjustment of said split-section gears.

18. In a rotary shear of the miss-cut type having two parallel rotary cutter shafts of which one is rockable toward and away from the other about a parallel axis and both are provided with longitudinal shear blades, the combination of a first helical gear on each cutter shaft; a train of three intermeditae helical gears drivingly connecting said first gears for turning said cutter shafts in opposite directions at relative speeds to bring said blades into periodic shearing alignment with each other when said gears are driven, at least one of said intermediate gears being mounted for rotation about said rocking axis and two successive ones of said intermediate gears being axially movable and rotatable as a unit and having teeth of opposite pitch angles, respectively; and means for axially adjusting said gear unit to cause relative angular adjustment of said cutter shafts for blade alignment, each of said first gears and the intermediate gear out of mesh therewith being formed of split sections and having means for axially adjusting one section away from the other section and for locking the former in its adjusted position to take up all backlash between the gears on adjustment of said split-section gears.

19. In a rotary shear having two parallel rotary cutter shafts provided with longitudinal shear blades, the combination of a first helical gear on each cutter shaft; a train of three intermediate helical gears drivingly connecting said first gears for turning said cutter shafts in opposite directions at relative speeds to bring said blades into periodic shearing relation with each other when said gears are driven, two successive ones of said intermediate gears being axially movable and rotatable as a unit and having teeth of opposite pitch angles, respectively, to cause relative angular adjustment of said cutter shafts for blade alignment and disalignment on axially shifting said gear unit in opposite directions, respectively, each of said first gears and the intermediate gear out of mesh therewith being formed of split sections and having means for axially adjusting one section away from the other section and for locking the former in its adjusted position to take up all backlash between the gears on adjustment of said split-section gears; means for axially shifting said gear unit; and stops on said cutter shafts, respectively, so coordinated as to abut each other when said blades are in their shearing relation aligned with each other.

20. The combination in a rotary shear as set forth in claim 19, in which the abutting surfaces of said stops are involute curves that mate in gear-tooth fashion within a range of relative positions of said blades in which they are in shearing relation with each other.

References Cited in the file of this patent

UNITED STATES PATENTS

| | | |
|---|---|---|
| 79,605 | Sibley | July 7, 1868 |
| 1,924,160 | Knowlton | Aug. 29, 1933 |
| 1,969,433 | Smitmans | Aug. 7, 1934 |
| 2,274,452 | Macfarren | Feb. 24, 1942 |
| 2,304,770 | Nichols | Dec. 8, 1942 |
| 2,642,938 | Hallden | June 23, 1953 |

FOREIGN PATENTS

| | | |
|---|---|---|
| 437,029 | Great Britain | Oct. 23, 1935 |
| 814,236 | Germany | Sept. 20, 1951 |